Patented Sept. 7, 1948

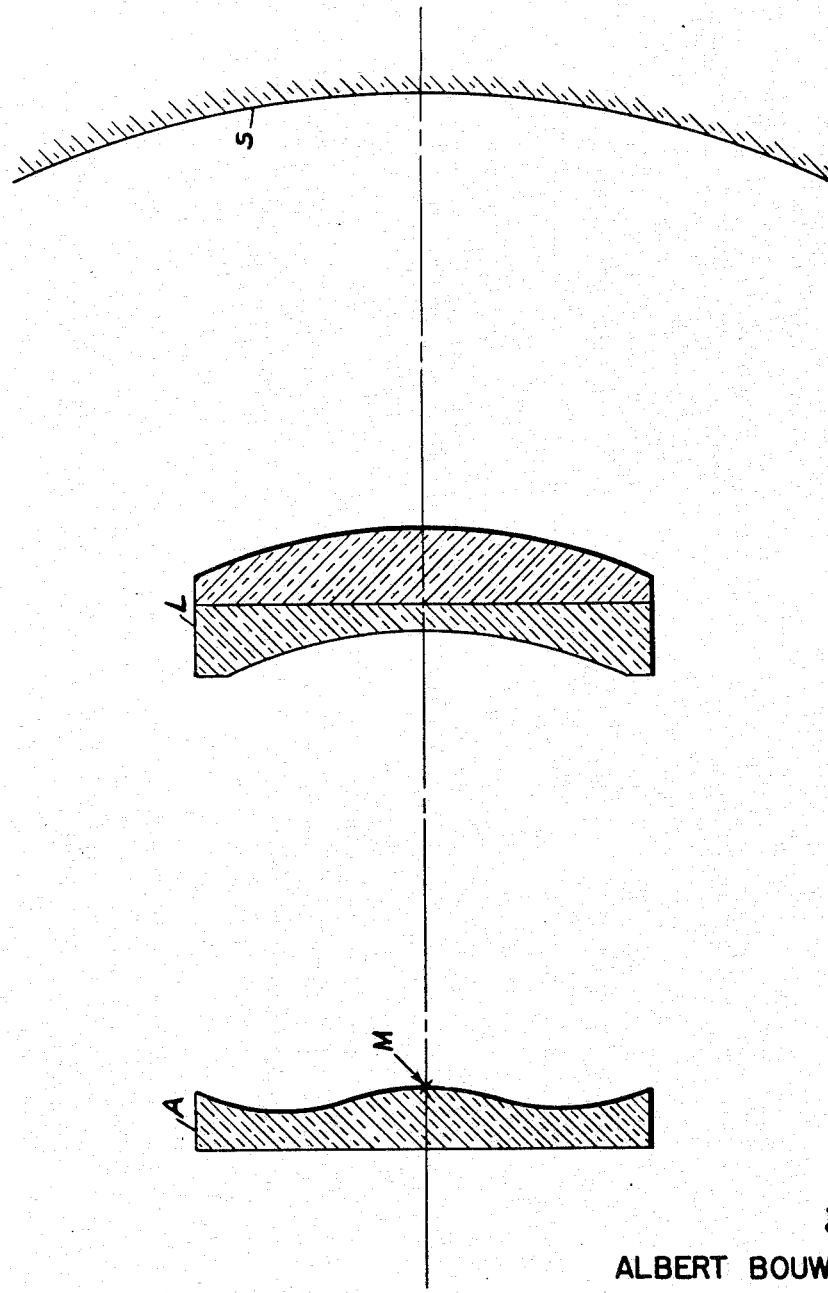

2,448,699

UNITED STATES PATENT OFFICE 2,448,699

SCHMIDT TYPE IMAGE FORMER WITH NEGATIVE MENISCUS LENS SPHERICAL ABERRATION CORRECTOR

Albert Bouwers, Delft, Netherlands, assignor to N. V. Optische Industrie "De Oude Delft," Delft, Netherlands Application December 18, 1945, Serial No. 635,687
In the Netherlands October 16, 1945

2 Claims. (Cl. 88—57)

It is known how to obtain an optical system having a high luminous power by providing a corrector plate at the centre of curvature of a spherical mirror, which corrector plate has such an aspherical surface as to remove the spherical aberration of the spherical mirror.

This system according to Schmidt has the advantage that the spherical aberration can be exactly eliminated i. e. that all of the incident rays parallel with the optical axis of the system are united in one point. In this case the so-called zone-error of the spherical abberation is consequently avoided.

This solution has the drawback, however, that incident light-beams not parallel with the optical axis do not strike the corrector plate perpendicularly, but at an angle. Due to this an asymmetry error appears in the image which is troublesome for many uses where a large field of image is required.

A mirror system having a high luminous power and not exhibiting this drawback has already been proposed. Therein the spherical aberration of the mirror is obviated by means of a lens having spherical limiting planes, this lens having the character of a weak negative meniscus lens and being concave either in the same sense as the mirror, in which case it is placed between the centre of curvature of the mirror and the mirror or in a sense opposite to that of the mirror in which case it is placed at a distance from the mirror which exceeds the radius of curvature of the mirror, the outer surfaces of this lens being preferably made concentric or substantially concentric with the surface of the mirror. This concentric positioning does not involve errors of asymmetry, since every straight line through the common centre of curvature of the mirror surface and the outer surfaces of the meniscus lens is an axis of symmetry of the system in an optical sense, the errors of asymmetry remaining small if the outer surfaces of the correction lens are approximately concentric with the mirror surface. Consequently such a concentric system is entirely or substantially entirely error-free in regard to a large image field, if the spherical aberration be suppressed.

For this reason even the known concentric system having an aperture 1:2 and an image field of, say 2 x 10° is preferable to Schmidt's system. In regard to very large relative apertures of 1:1 and more this preference even holds for an image field of 2 x 7.5° or 2 x 5°. This is due to the fact that the corrector plate in Schmidt's system in regard to larger relative apertures has to exercise a stronger refractive effect on the incident light rays parallel with the optical axis. At the same time this involves, however, that this corrector plate confers on the oblique light beams a larger asymmetry error than in the case of a corrector plate having a less strong refractive effect. This preference remains, notwithstanding the fact that the zone error of the spherical aberration may be annoying for very large relative apertures if a meniscus correcting element is used alone.

The present invention has for its object to provide a system uniting the advantages of a large image field and of exact elimination of the spherical aberration.

According to the invention this is ensured by means of an optical system comprising:

(a) A spherical concave mirror;

(b) One or more correction lenses having spherical limiting surfaces, which have the character of a negative meniscus lens, of which the centres of curvature of the outer limiting surfaces are at the most at a distance of ¼ of the radius of curvature of the mirror from the centre of curvature of the mirror and preferably coincide therewith, and which are proportioned in such manner that the spherical aberration of the system consisting of mirror and correction lens is at least partly eliminated;

(c) A corrector plate having an aspherical surface, which is placed at or near the centre of curvature of the mirror and corrects the remaining spherical aberration of the system.

Since elimination of the spherical aberration is at least partly effected by the correction lens, the refractive effect exerted on the incident light beams by the aspherical surface of the corrector plate may be much smaller than in Schmidt's system, as a result of which the image field may be made proportionately larger. This advantage is obtained in the case of the spherical aberration being exactly removed, so that the system according to the invention may be given both a large image field and a large relative aperture.

In the table below a comparison is given, in regard to various values of image field and relative aperture, between the aberrations of Schmidt's system, the known concentric system and a concentric system which is corrected by means of an aspherical correcting plate according to the invention. The values stated concern the largest dimension of the meridional disc which ensues upon projection of an object point at an infinite distance and are expressed in thousandths of the focal distance of the whole system.

The symbol < signifies smaller than, whereas > is larger than:

| field of image | relative aperture 1:1.5 | | | 1:1 | | | 1:0.65 | | |
|---|---|---|---|---|---|---|---|---|---|
| | Schmidt's system | concentric system | corr. conc. system | Schmidt's system | concentric system | corr. conc. system | Schmidt's system | conc. syst. | corr. conc. system |
| *Degrees* | | | | | | | | | |
| 0 | 0 | 0.02 | 0 | 0 | 0.17 | 0 | 0 | 2.0 | 0 |
| 10 | 0.10 | 0.02 | <0.01 | 0.33 | 0.17 | <0.01 | 1.2 | 2.0 | 0.15 |
| 20 | 0.39 | 0.02 | <0.01 | 1.3 | 0.17 | 0.02 | 4.9 | 2.0 | 0.35 |
| 30 | 0.87 | 0.02 | <0.01 | 3.0 | 0.17 | 0.05 | 10.8 | 2.0 | 0.15 |
| 40 | 1.5 | 0.02 | <0.01 | 5.2 | 0.17 | 0.08 | >10 | 2.0 | 1.0 |
| 50 | 2.4 | 0.02 | <0.01 | 3.2 | 0.17 | 0.12 | >10 | 2.0 | 1.7 |
| 60 | 3.4 | 0.02 | 0.01 | 11.7 | 0.17 | 0.15 | >10 | 2.0 | 2.5 |

The great advantage of the system according to the invention clearly appears from this table.

If the system without corrector plate is achromatised, this advantage also holds for the whole system, since the aspherical plate departs very little from a plane-parallel plate so that it does not appreciably contribute to the chromatic aberration.

If desired a plurality of aspherical surfaces may be used. For example, the aspherical correction element may be composed of cemented lenses so that two aspherical refractive surfaces are provided through which the incident light must pass. Each of these surfaces may then have smaller curvatures than a single aspherical refractice surface.

The invention will be explained more fully by reference to the accompanying drawing, in which an optical system according to the invention is sketched by way of example.

The corrector plate A is provided at the centre of curvature M of the spherical concave mirror S. The outer surfaces of the meniscus lens L are concentric with the mirror S. The system consisting of the meniscus lens L and the mirror S is corrected both chromatically and spherically. The chromatic correction is obtained by dividing the meniscus lens, by means of a flat cement surface, into two parts, of which the kinds of glass have the same refractive index in regard to the average wavelength of the light used, but of which the dispersion numbers are different. The spherical correction in regard to an object at an infinite distance from the system meniscus lens/mirror is optimum but there is one residual error i. e. the zone-error of the spherical aberration. The aspherical surface of the corrector plate is so designed as to eliminate this zone-error completely. As a result thereof an object point on the optical axis at an infinite distance is projected entirely free from spherical aberration.

What I claim is:
1. An optical system comprising a concave spherical mirror, a refractive correction element having spherical refractive surfaces and having the character of a negative meniscus lens, the centers of curvature of said surfaces being within a distance from the center of curvature of said mirror less than one-fourth the radius of curvature of said mirror, said element being positioned between the mirror and the center of curvature thereof to be traversed only once by light rays entering the system, and a correction plate comprising an aspherical refractive surface placed substantially at the center of curvature of said mirror, said correction element and said correction plate substantially eliminating the spherical aberration introduced in said system by said mirror.

2. An optical system comprising a concave spherical mirror, a refractive correction element having spherical refracting surfaces and having the character of a negative meniscus lens, the centers of curvature of said surfaces being substantially coincident with the center of curvature of said mirror, said element being positioned between the mirror and the center of curvature thereof to be traversed only once by light rays incident on the system and to eliminate a portion of the spherical aberration introduced in said system by said mirror, and a correction plate having an aspherical refractive surface positioned substantially at the center of curvature of said mirror, said correction plate serving substantially to eliminate the remainder of the spherical aberration of said system introduced by said mirror.

ALBERT BOUWERS.

REFERENCES CITED

The following references are of record in the file of this patent:

UNITED STATES PATENTS

| Number | Name | Date |
|---|---|---|
| 2,141,884 | Sonnefeld | Dec. 27, 1938 |
| 2,170,979 | Straubel | Aug. 29, 1939 |
| 2,273,801 | Landis | Feb. 17, 1942 |
| 2,350,112 | Houghton | May 30, 1944 |

FOREIGN PATENTS

| Number | Country | Date |
|---|---|---|
| 82,671 | Germany | Aug. 7, 1895 |
| 544,694 | Great Britain | Apr. 23, 1942 |
| 554,024 | Great Britain | June 16, 1943 |